(12) United States Patent
Yano et al.

(10) Patent No.: US 8,490,389 B2
(45) Date of Patent: Jul. 23, 2013

(54) EXHAUST GAS PURIFICATION APPARATUS FOR ENGINE

(75) Inventors: Masakazu Yano, Ageo (JP); Kiminobu Hirata, Ageo (JP); Nobuhiko Masaki, Ageo (JP)

(73) Assignee: UD Trucks Corporation, Ageo-shi (JP)

( * ) Notice: Subject to any disclaimer, the term of this patent is extended or adjusted under 35 U.S.C. 154(b) by 202 days.

(21) Appl. No.: 13/047,129

(22) Filed: Mar. 14, 2011

(65) Prior Publication Data

US 2011/0162351 A1    Jul. 7, 2011

Related U.S. Application Data

(63) Continuation of application No. PCT/JP2009/066133, filed on Sep. 16, 2009.

(30) Foreign Application Priority Data

Sep. 26, 2008 (JP) ................................. 2008-247359

(51) Int. Cl.
*F01N 3/00* (2006.01)
*F01N 3/10* (2006.01)

(52) U.S. Cl.
USPC .................... 60/286; 60/295; 60/301; 60/303

(58) Field of Classification Search
USPC .............................. 60/275, 286, 295, 301, 303
See application file for complete search history.

(56) References Cited

U.S. PATENT DOCUMENTS

2005/0229719 A1    10/2005  Rieder et al.
2007/0022743 A1*   2/2007  Telford et al. .................. 60/286

FOREIGN PATENT DOCUMENTS

| JP | 5-133785 A | 5/1993 |
| JP | 2003-293740 | 10/2003 |
| JP | 2006-214310 A | 8/2006 |
| JP | 2006214310 A * | 8/2006 |
| JP | 2007-182803 A | 7/2007 |
| JP | 2007-529728 A | 10/2007 |

OTHER PUBLICATIONS

Japanese Office Action and English Language Translation dated Aug. 21, 2012 (7 pages).
Chinese Office Action and English Language Translation dated Oct. 10, 2012 (12 pages).

* cited by examiner

*Primary Examiner* — Kenneth Bomberg
*Assistant Examiner* — Audrey K Bradley
(74) *Attorney, Agent, or Firm* — Foley & Lardner LLP (57) ABSTRACT

In an exhaust gas purification apparatus for an engine includes a bubble generation device, the bubble generation device for mixing nano-sized to micro-sized bubbles into a liquid reducing agent or a precursor thereof injection-supplied from an injection nozzle is disposed in a reducing agent supply system running from a reducing agent tank to the injection nozzle. When the liquid reducing agent or the precursor thereof is injection-supplied from the injection nozzle, the liquid reducing agent or the precursor thereof is divided by bubbles, and the bubbles are radically inflated and burst by a pressure change and a temperature change at the time of injection-supplying, so that microparticulation of the liquid reducing agent or the precursor thereof is facilitated.

7 Claims, 9 Drawing Sheets

EXHAUST GAS PURIFICATION APPARATUS FOR ENGINE

This application is a continuation of PCT/JP2009/066133, filed on Sep. 16, 2009.

BACKGROUND OF THE INVENTION

1. Field of the Invention

The present invention relates to an exhaust gas purification apparatus for an engine for reducing and purifying nitrogen oxides (NOx) contained in exhaust gas from an engine.

2. Description of Related Art

An exhaust gas purification apparatus disclosed in Japanese Laid-Open (Kokai) Patent Application Publication No. 2003-293740 is proposed as a catalyst purification system for purifying NOx contained in exhaust gas from an engine. This exhaust gas purification apparatus injection-supplies a liquid reducing agent or a precursor thereof at a flow rate in accordance with an engine operation state to exhaust gas on an exhaust upstream side of a NOx reduction catalytic converter disposed in an exhaust passage, so that NOx is subjected to selective reduction reaction with the reducing agent in the NOx reduction catalytic converter. Thus, NOx is purified and converted into harmless components.

SUMMARY OF THE INVENTION

However, when a grain diameter of the liquid reducing agent or the precursor thereof injection-supplied to the exhaust gas on the exhaust upstream side of the NOx reduction catalytic converter is large, the liquid reducing agent or the precursor thereof is not sufficiently diffused and evaporated. Thus, concentration irregularity of the reducing agent supplied to the NOx reduction catalytic converter is easily generated, and there is a possibility that NOx purification efficiency is lowered. In a case in which the precursor of the liquid reducing agent is injection-supplied to the exhaust gas on the exhaust upstream side of the NOx reduction catalytic converter, speed of chemical reaction such as hydrolysis reaction of generating the reducing agent from the precursor of the liquid reducing agent is lowered, and similarly, there is a possibility that the NOx purification efficiency is lowered.

Thus, in view of the above conventional problems, the present technique has an object to provide an exhaust gas purification apparatus of mixing fine bubbles into a liquid reducing agent or a precursor thereof injection-supplied to exhaust gas on an exhaust upstream side of a NOx reduction catalytic converter, and radially inflating and bursting the bubbles by a temperature change and a pressure change at the time of injection-supplying, so as to facilitate microparticulation of the liquid reducing agent or the precursor thereof.

An exhaust gas purification apparatus according to the present technology includes a reduction catalytic converter disposed in an engine exhaust passage for reducing and purifying NOx with using a reducing agent, a reducing agent tank storing a liquid reducing agent or a precursor thereof, an injection nozzle for injection-supplying the liquid reducing agent or the precursor thereof to exhaust gas on the exhaust upstream side of the reduction catalytic converter, a flow rate control valve for controlling a flow rate of the liquid reducing agent or the precursor thereof supplied from the reducing agent tank to the injection nozzle, a control unit for controlling the flow rate control valve so that the liquid reducing agent or the precursor thereof at a flow rate in accordance with an engine operation state is supplied to the injection nozzle, and a bubble generation device disposed in a reducing agent supply system running from the reducing agent tank to the injection nozzle, the bubble generation device mixing nano-sized to micro-sized bubbles into the liquid reducing agent or the precursor thereof injection-supplied from the injection nozzle.

According to this exhaust gas purification apparatus, by appropriately operating the bubble generation device disposed in the reducing agent supply system running from the reducing agent tank to the injection nozzle, the nano-sized to micro-sized bubbles are mixed into the liquid reducing agent or the precursor thereof injection-supplied from the injection nozzle to the exhaust gas on the exhaust upstream side of the reduction catalytic converter. When the liquid reducing agent or the precursor thereof containing the bubbles is injection-supplied from the injection nozzle, division of the liquid reducing agent or the precursor thereof is facilitated by the bubbles, and the bubbles are radically inflated and burst by a pressure change and a temperature change at the time of injection-supplying, so that microparticulation of the liquid reducing agent or the precursor thereof can be facilitated. Therefore, the microparticulated liquid reducing agent or the precursor thereof is sufficiently diffused and evaporated, and concentration irregularity of the reducing agent supplied to the reduction catalytic converter is reduced. Thus, purification efficiency of nitrogen oxides can be enhanced while effectively utilizing the liquid reducing agent or the precursor thereof. In a case in which the precursor of the liquid reducing agent is injection-supplied to the exhaust gas on the exhaust upstream side of the reduction catalytic converter, the microparticulation of the precursor of the liquid reducing agent is facilitated. Thus, speed of reaction such as hydrolysis reaction of generating the reducing agent from the precursor of the liquid reducing agent can also be enhanced.

DESCRIPTION OF THE PREFERRED EMBODIMENTS

Hereunder is a detailed description of the present technique with reference to the attached drawings.

Figure 1:
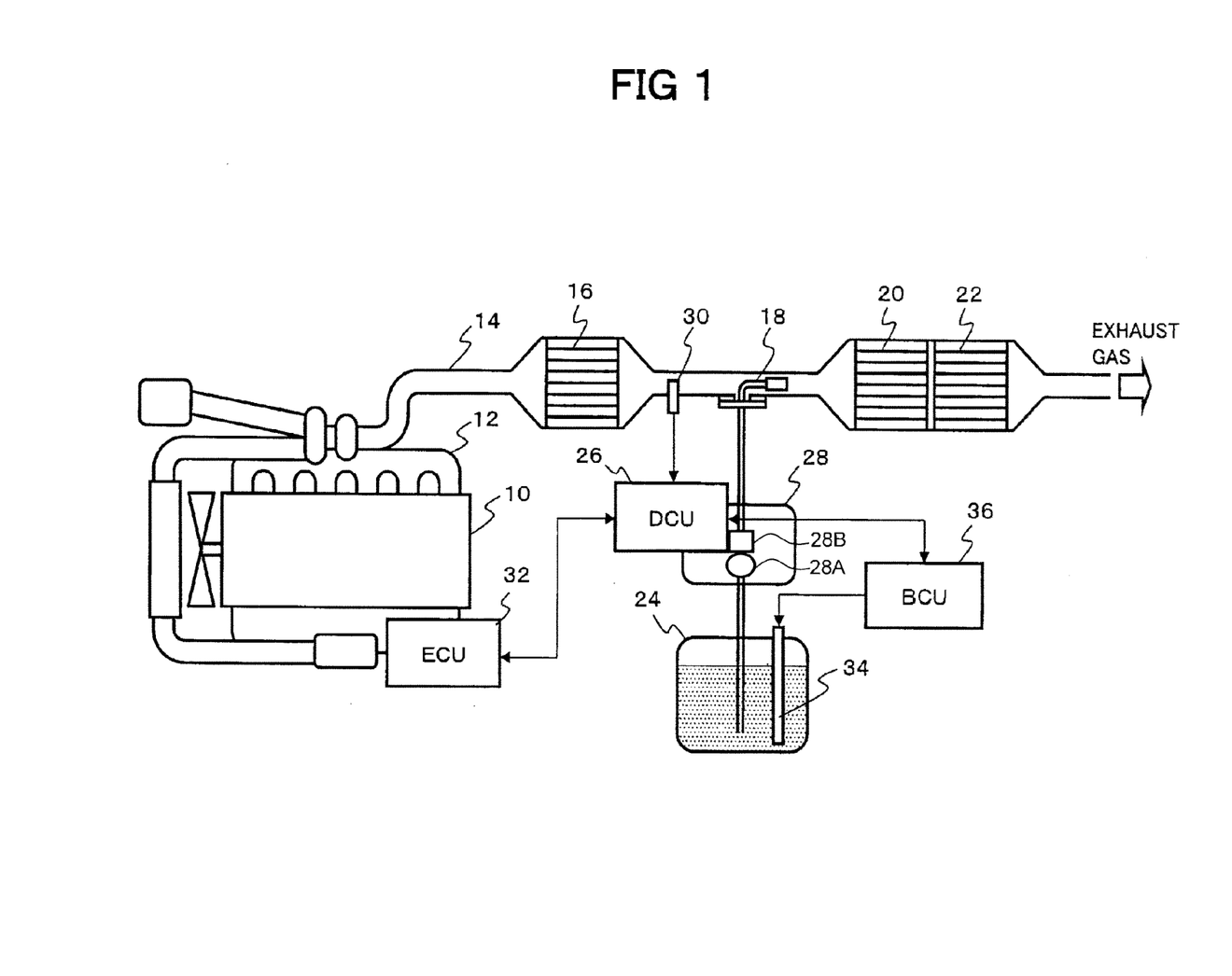
FIG. 1 is an entire configuration view illustrating a first embodiment of an exhaust gas purification apparatus embodying the present technology.

FIG. 1 illustrates a first embodiment of an exhaust gas purification apparatus for selectively reducing and purifying NOx contained in exhaust gas from an engine 10 with using a urea aqueous solution serving as a precursor of a liquid reducing agent.

In an exhaust pipe 14 (an exhaust passage) connected to an exhaust manifold 12 of the engine 10, in the exhaust flow direction, there is disposed: a nitrogen oxidation catalytic converter 16 for oxidizing nitrogen monoxide (NO) to nitrogen dioxide ($NO_2$); an injection nozzle 18 for injection-supplying the urea aqueous solution in a spray state; a NOx reduction catalytic converter 20 for reducing and purifying NOx with using ammonia generated by hydrolyzing the urea aqueous solution; and an ammonia oxidation catalytic converter 22 for oxidizing ammonia passing through the NOx reduction catalytic converter 20 in this order.

The urea aqueous solution stored in a reducing agent tank 24 is supplied to the injection nozzle 18 via a reducing agent dosing device 28 having a pump 28A and a flow rate control valve 28B electronically controlled by a reducing agent dosing control unit (hereinafter, referred to as the "DCU (Dosing Control Unit)"). To the exhaust pipe 14 positioned between the nitrogen oxidation catalytic converter 16 and the injection nozzle 18, a temperature sensor 30 for measuring an exhaust temperature is attached, and an output signal of the temperature sensor 30 is inputted to the DCU 26. Furthermore, in order to appropriately read in rotation speed and a load of the engine 10, the DCU 26 is connected to an engine control unit (hereinafter, referred to as the "ECU") 32 via a network such as a CAN (Controller Area Network). As the engine load, known state amounts such as a fuel injection amount, an acceleration operation amount, a throttle opening, an intake flow rate, intake negative pressure, and supercharging pressure can be adopted. It should be noted that the engine rotation speed and the load may be directly detected with using a known sensor.

In this exhaust gas purification apparatus, the urea aqueous solution injection-supplied from the injection nozzle 18 is hydrolyzed by exhaust heat and vapor in the exhaust gas, so that ammonia is generated. It is known that this ammonia is subjected to selective reduction reaction with NOx in the exhaust gas in the NOx reduction catalytic converter 20, so as to be converted into harmless water ($H_2O$) and nitrogen ($N_2$). At this time, in order to enhance NOx purification efficiency in the NOx reduction catalytic converter 20, NO is oxidized to $NO_2$ by the nitrogen oxidation catalytic converter 16, so that a ratio between NO and $NO_2$ in the exhaust gas is improved to be suitable for the selective reduction reaction. Meanwhile, ammonia passing through the NOx reduction catalytic converter 20 is oxidized by the ammonia oxidation catalytic converter 22 disposed on an exhaust downstream side of the NOx reduction catalytic converter 20. Thus, ammonia is suppressed from being discharged into the atmosphere straightaway.

In order to mix nano-sized bubbles (nano-bubbles) into the stored urea aqueous solution, for example, a bubble generation device 34 including an oscillator or a rapidly rotating fin is disposed in the reducing agent tank 24. The bubble generation device 34 is electronically controlled by a bubble generation control unit (hereinafter, referred to as the "BCU (Bubble Control Unit)") 36 connected to the DCU 26 via a network such as a CAN. It should be noted that the bubble generation device 34 may be electronically controlled by the DCU 26.

Figure 2:
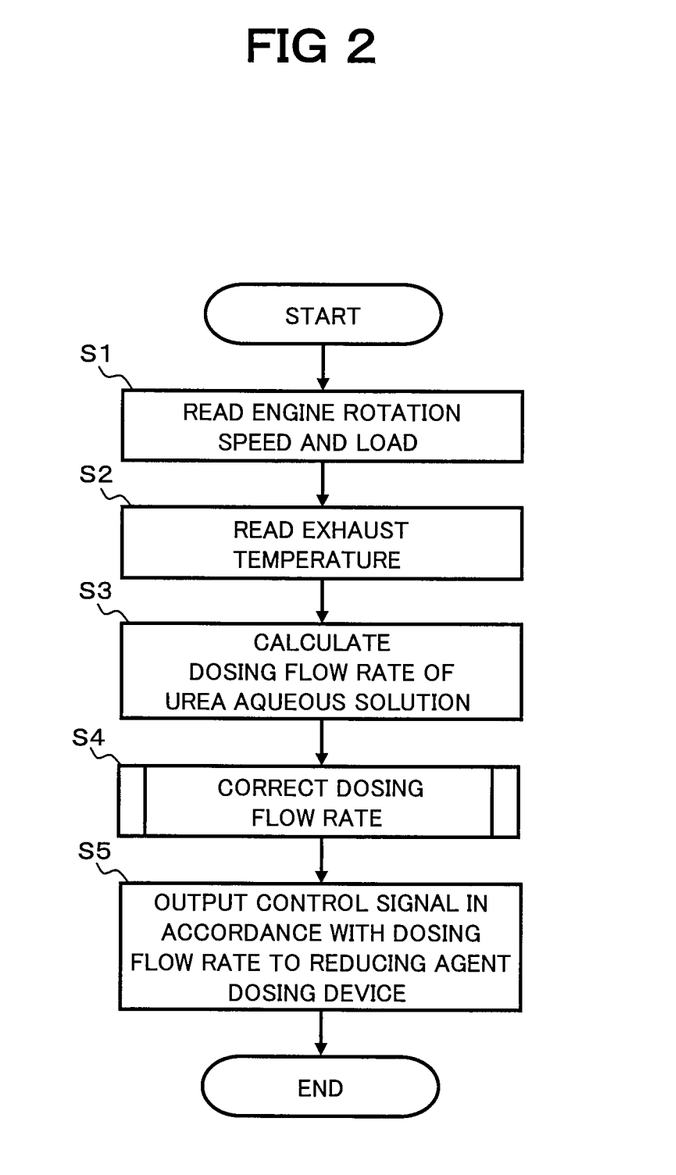
FIG. 2 is a flowchart of a main routine illustrating urea aqueous solution dosing processing.

FIG. 2 illustrates, in the DCU 26, a main routine of urea aqueous solution dosing processing repeatedly executed at first predetermined intervals of time with start of the engine 10 as a trigger.

In step 1 (abbreviated to "S1" in the figure and the same will be applied to the other steps), the DCU 26 respectively reads in the engine rotation speed and the load from the ECU 32.

In step 2, the DCU 26 reads in the exhaust temperature from the temperature sensor 30.

In step 3, the DCU 26 refers to a dosing flow rate map in which a dosing flow rate corresponding to the engine rotation speed, the load, and the exhaust temperature serving as an engine operation state is set, and calculates a dosing flow rate of the urea aqueous solution in accordance with the engine rotation speed, the load, and the exhaust temperature read in step 1 and step 2.

In step 4, in order to correct the state that an absolute amount of the urea aqueous solution per unit volume is reduced by mixing the nano-bubbles into the urea aqueous solution by the bubble generation device 34, the DCU 26 calls a sub routine for correcting the dosing flow rate.

In step 5, the DCU 26 outputs a control signal in accordance with the corrected dosing flow rate to the reducing agent dosing device 28.

Figure 3:
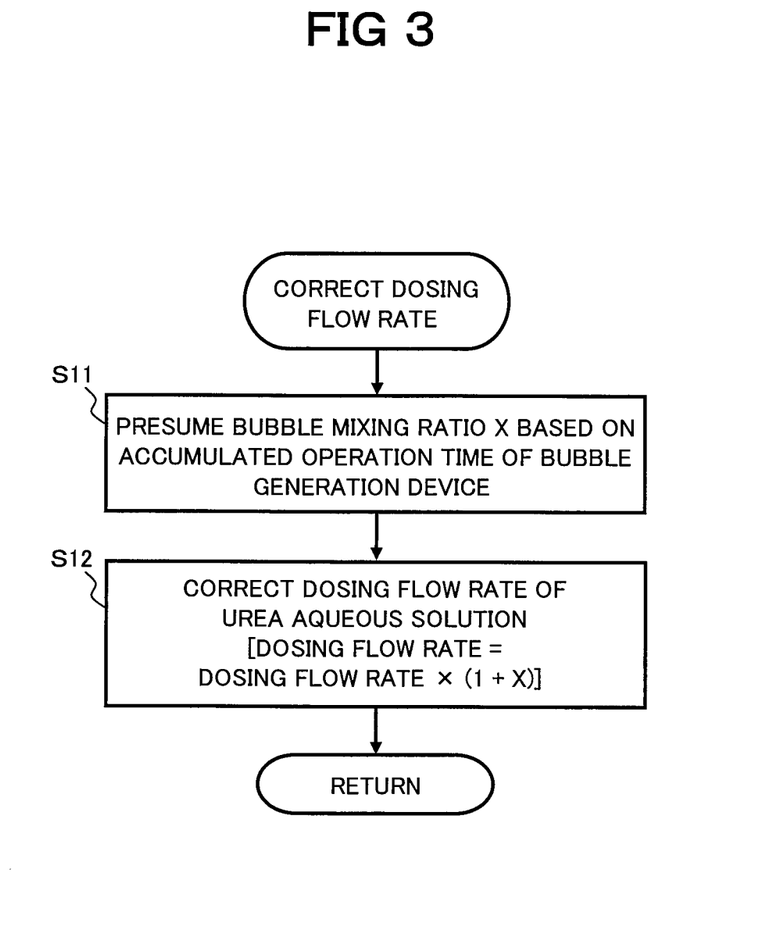
FIG. 3 is a flowchart of a sub routine illustrating dosing flow rate correction processing.

FIG. 3 illustrates the sub routine of dosing flow rate correction processing of the urea aqueous solution.

Figure 4:
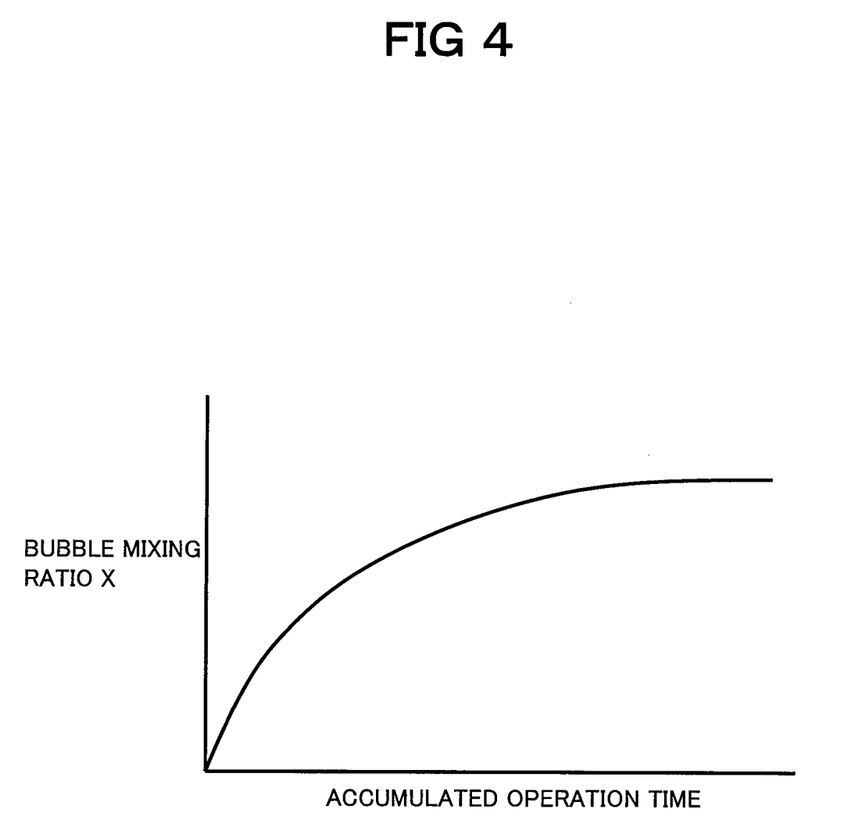
FIG. 4 is an explanatory view illustrating a bubble mixing ratio presumption map.

In step 11, the DCU 26 refers to a bubble mixing ratio presumption map illustrated in FIG. 4, and presumes a bubble mixing ratio X (a mixing ratio of the nano-bubbles mixed into the urea aqueous solution per unit volume) in accordance with accumulated operation time of the bubble generation device 34. The bubble mixing ratio presumption map can be theoretically determined based on an output characteristic of the bubble generation device 34 and a physical characteristic of the nano-bubbles, or can be empirically determined through experiments. As the output characteristic of the bubble generation device 34, for example, the number and a diameter of particles of the nano-bubbles generated per unit time, and the like are applicable. Meanwhile, as the physical characteristic of the nano-bubbles, for example, the life and saturation concentration of the nano-bubbles, and the like are applicable.

In step 12, the DCU 26 corrects to increase the dosing flow rate of the urea aqueous solution with using a correction expression "dosing flow rate=dosing flow rate×(1+X)" based on the presumed bubble mixing ratio X.

According to such an exhaust gas purification apparatus, by appropriately operating the bubble generation device 34, the nano-bubbles are mixed into the urea aqueous solution stored in the reducing agent tank 24. When the urea aqueous solution containing the nano-bubbles is injection-supplied by injection from the injection nozzle 18, division of the urea aqueous solution is facilitated by the nano-bubbles, and the nano-bubbles are radically inflated and burst by a pressure change and a temperature change at the time of injection-supplying, so that microparticulation of the urea aqueous solution can be facilitated. Therefore, the microparticulated urea aqueous solution is sufficiently diffused and evaporated, and concentration irregularity of ammonia supplied to the NOx reduction catalytic converter 20 is reduced. Thus, NOx purification efficiency can be enhanced while effectively utilizing the urea aqueous solution. By microparticulating the urea aqueous solution, speed of hydrolysis reaction of generating ammonia from the urea aqueous solution can also be enhanced.

At this time, in consideration with the state that the nano-bubbles are mixed into the urea aqueous solution, so that the absolute amount of the urea aqueous solution per unit volume is reduced, the dosing flow rate of the urea aqueous solution is corrected to increase. Therefore, the dosing flow rate of the urea aqueous solution in accordance with the engine operation state is properly held, so that for example, a disadvantage that a desired NOx purification ratio cannot be obtained due to lack of ammonia supplied to the NOx reduction catalytic converter 20 can be avoided.

Figure 5:
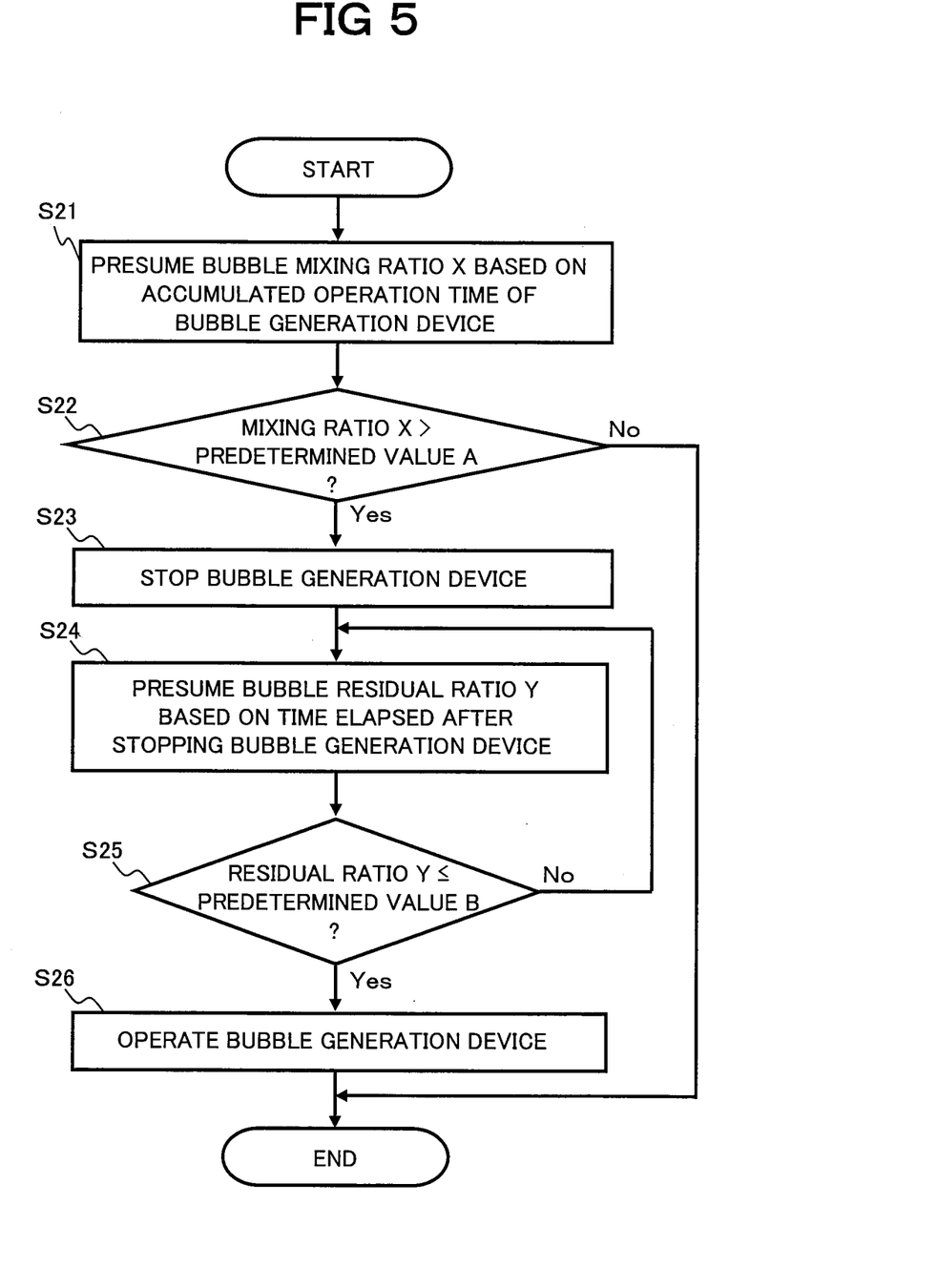
FIG. 5 is a flowchart illustrating bubble generation control processing.

FIG. 5 illustrates, in the BCU 36, bubble generation control processing repeatedly executed at second predetermined intervals of time with the start of the engine 10 as the trigger.

In step 21, the BCU 36 refers to the bubble mixing ratio presumption map illustrated in FIG. 4, and presumes the bubble mixing ratio X in accordance with the accumulated operation time of the bubble generation device 34.

In step 22, the BCU 36 determines whether or not the bubble mixing ratio X is greater than a predetermined value A. The predetermined value A is a threshold value defining an upper limit of the mixing ratio of the nano-bubbles mixed into the urea aqueous solution per unit volume, appropriately set in accordance with the physical characteristic of the nano-bubbles, for example. The BCU 36 proceeds the processing to step 23 when the bubble mixing ratio X is greater than the predetermined value A (Yes), and terminates the processing when the bubble mixing ratio X is equal to or less than the predetermined value A (No).

In step 23, the BCU 36 stops the bubble generation device 34.

Figure 6:
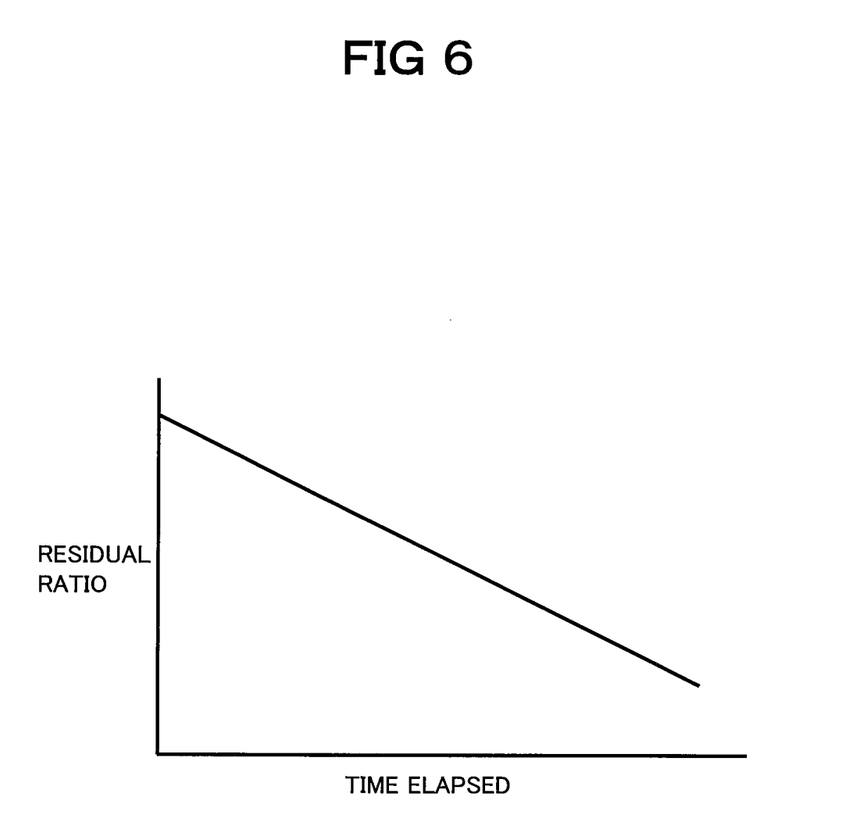
FIG. 6 is an explanatory view illustrating a bubble residual ratio presumption map.

In step 24, the BCU 36 presumes a bubble residual ratio Y of the remaining nano-bubbles in the urea aqueous solution per unit volume based on elapsed time after stopping the bubble generation device 34. That is, the BCU 36 refers to a residual ratio presumption map illustrated in FIG. 6, and calculates a residual ratio in accordance with the elapsed time after stopping the bubble generation device 34. The BCU 36 multiplies the bubble mixing ratio X when the bubble generation device 34 is stopped by the residual ratio, so as to presume the bubble residual ratio Y.

In step 25, the BCU 36 determines whether or not the bubble residual ratio Y is equal to or less than a predetermined value B. The predetermined value B is a threshold value defining a lower limit of the mixing ratio of the nano-bubbles mixed into the urea aqueous solution per unit volume, appropriately set in accordance with the physical characteristic of the nano-bubbles, for example. The BCU 36 proceeds the processing to step 26 when the bubble residual ratio Y is equal to or less than the predetermined value B (Yes), and returns the processing to step 24 when the bubble residual ratio Y is greater than the predetermined value B (No). It should be noted that the predetermined value B may be the same value as the predetermined value A defining the upper limit of the mixing ratio of the nano-bubbles.

In step 26, the BCU 36 operates the bubble generation device 34.

In such a way, the operation and the stop of the bubble generation device 34 are controlled so that the bubble mixing ratio of the nano-bubbles in the urea aqueous solution stored in the reducing agent tank 24 is maintained within a predetermined range or brought close to the predetermined value. Therefore, since the bubble generation device 34 is not always operated, excessive mixing of the nano-bubbles can be suppressed while reducing energy required for mixing the nano-bubbles into the urea aqueous solution.

Figure 7:
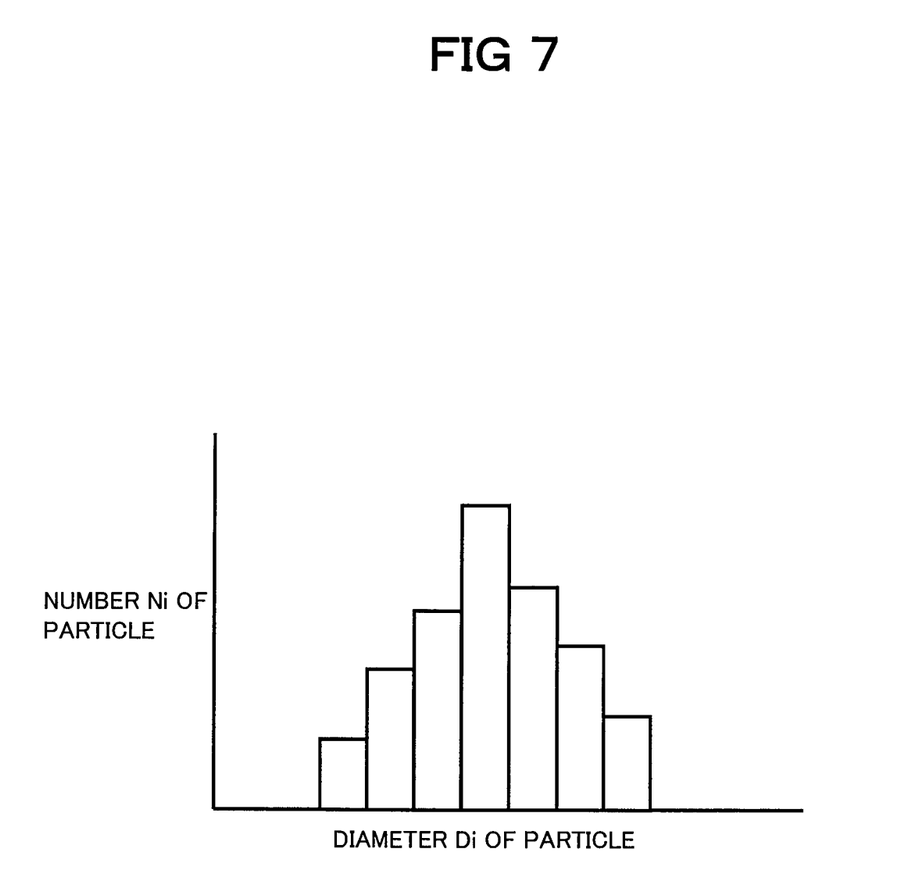
FIG. 7 is an explanatory view illustrating one example of measurement results of the number and a diameter of particles of nano-bubbles.

It should be noted that instead of operating or stopping the bubble generation device 34, an output thereof may be increased or decreased. Instead of referring to the bubble mixing ratio presumption map illustrated in FIG. 4 and presuming the bubble mixing ratio X, a particle measuring instrument (a particle counter) for measuring the number and the diameter of the particles of the nano-bubbles mixed into the urea aqueous solution per unit volume may be used, and the bubble mixing ratio X may be calculated from an output thereof. Specifically, in a case in which the number Ni and a diameter Di of the particles illustrated in FIG. 7 are measured by the particle measuring instrument, the bubble mixing ratio X can be calculated by the following expression.

$$\text{Bubble mixing ratio } X = \sum \left(\frac{\pi}{6} D_i^3 \times N_i\right) \quad \text{[Equation 1]}$$

Figure 8:
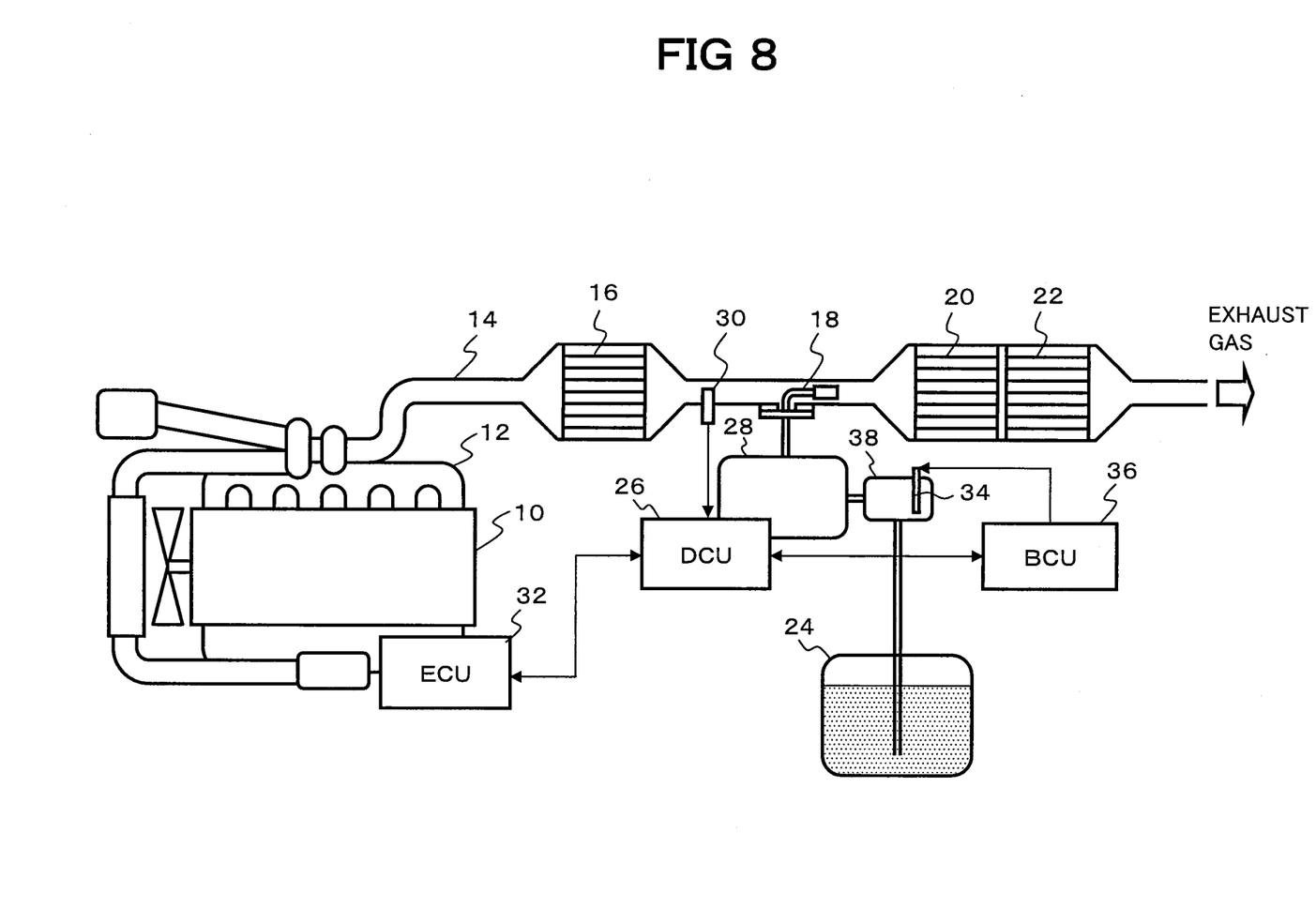
FIG. 8 is an entire configuration view illustrating a second embodiment of the exhaust gas purification apparatus embodying the present technology.

FIG. 8 illustrates a second embodiment of the exhaust gas purification apparatus for selectively reducing and purifying NOx contained in the exhaust gas from the engine with using the urea aqueous solution serving as the precursor of the liquid reducing agent. It should be noted that same reference numerals are used for the components which are identical to those of the first embodiment, and description thereof will be simplified or omitted (the same will also be applied to the other embodiment).

In the present embodiment, a sub tank 38 having smaller capacity than the reducing agent tank 24 is disposed between the reducing agent tank 24 and the reducing agent dosing device 28. The bubble generation device 34 is disposed not in the reducing agent tank 24 but in the sub tank 38.

In such a way, by mixing the nano-bubbles into the urea aqueous solution in the sub tank 38 having smaller capacity than the reducing agent tank 24, size of the bubble generation device 34 can be decreased and consumed energy can be reduced. It should be noted that with regard to the other operations and effects which are the same as the first embodiment, refer to the description of the first embodiment.

Figure 9:
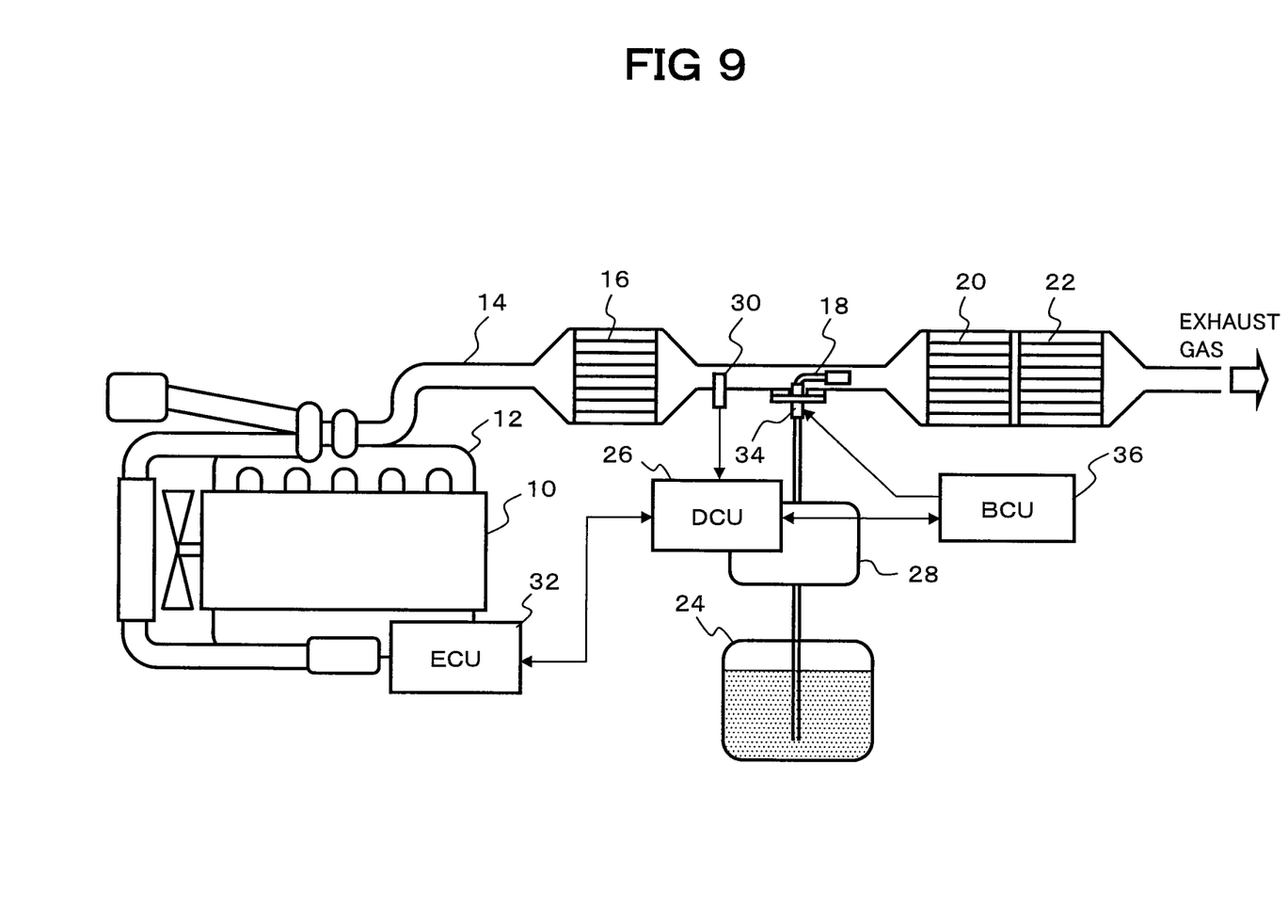
FIG. 9 is an entire configuration view illustrating a third embodiment of the exhaust gas purification apparatus embodying the present technology.

FIG. 9 illustrates a third embodiment of the exhaust gas purification apparatus for selectively reducing and purifying NOx contained in the exhaust gas from the engine with using the urea aqueous solution serving as the precursor of the liquid reducing agent.

In the present embodiment, the bubble generation device 34 is disposed (built) not in the reducing agent tank 24 but in the injection nozzle.

In this manner, the nano-bubbles are only required to be mixed into the urea aqueous solution of which flow rate is controlled by the reducing agent dosing device 28, and there is no need for correcting the dosing flow rate of the urea aqueous solution, so that control can be simplified. It should be noted that in the present embodiment, since the urea aqueous solution passes through the bubble generation device 34 for extremely short time, there is no need for maintaining the bubble mixing ratio X within the predetermined range or to the predetermined value.

The bubbles mixed into the urea aqueous solution are not limited to the nano-bubbles, but micronano-bubbles and micro-bubbles, that is, nano-sized to micro-sized bubbles can be adopted. The bubble generation device 34 may be disposed in a reducing agent supply system running from the reducing agent tank 24 to the injection nozzle 18. Furthermore, the liquid reducing agent or the precursor thereof is not limited to the urea aqueous solution, but ammonia or gasoline, diesel oil, and the like mainly composed of hydrocarbon can be applied in accordance with the selective reduction reaction in the NOx reduction catalytic converter 20.

What is claimed is:
1. An exhaust gas purification apparatus for an engine, comprising:
 a reduction catalytic converter disposed in an engine exhaust passage for reducing and purifying nitrogen oxides using a reducing agent;

a reducing agent tank storing a liquid reducing agent or a precursor thereof;

an injection nozzle for supplying, by injection, the liquid reducing agent or the precursor thereof to exhaust gas on an upstream side of the reduction catalytic converter;

a flow rate control valve for controlling a flow rate of the liquid reducing agent or the precursor thereof supplied from the reducing agent tank to the injection nozzle;

a control unit for controlling the flow rate control valve so that the liquid reducing agent or the precursor thereof, at a flow rate in accordance with an engine operation state, is supplied to the injection nozzle; and an oscillator or fin disposed in a reducing agent supply system running from the reducing agent tank to the injection nozzle, wherein the oscillator is oscillated or the fin is rapidly rotated to thereby mix nano-sized to micro-sized bubbles into the liquid reducing agent or the precursor thereof injection- supplied from the injection nozzle, wherein the control unit further presumes a mixing ratio of the bubbles mixed into the liquid reducing agent or the precursor thereof per unit volume by the oscillator or fin, and corrects the flow rate of the liquid reducing agent or the precursor thereof in accordance with the engine operation state based on the presumed mixing ratio of the bubbles.

2. An exhaust gas purification apparatus for an engine according to claim 1, wherein the control unit refers to a map in which the mixing ratio of the bubbles in accordance with accumulated operation time of the oscillator or fin is set, and presumes the mixing ratio of the bubbles in accordance with the accumulated operation time of the oscillator or fin.

3. An exhaust gas purification apparatus for an engine according to claim 1, wherein the control unit further controls the oscillator or fin so that a mixing ratio of the bubbles mixed into the liquid reducing agent or the precursor thereof per unit volume is maintained within a predetermined range or to be a predetermined value.

4. An exhaust gas purification apparatus for an engine according to claim 1, wherein the oscillator or fin is disposed in the reducing agent tank.

5. An exhaust gas purification apparatus for an engine according to claim 1, further comprising:

a sub tank disposed in the reducing agent supply system positioned between the reducing agent tank and the flow rate control valve, the sub tank having smaller capacity than the reducing agent tank, wherein the oscillator or fin is disposed in the sub tank.

6. An exhaust gas purification apparatus for an engine according to claim 1, wherein the oscillator or fin is disposed in the injection nozzle.

7. An exhaust gas purification apparatus for an engine, comprising:

a reduction catalytic converter disposed in an engine exhaust passage for reducing and purifying nitrogen oxides using a reducing agent;

a reducing agent tank storing a liquid reducing agent or a precursor thereof;

an injection nozzle for supplying, by injection, the liquid reducing agent or the precursor thereof to exhaust gas on an upstream side of the reduction catalytic converter;

a flow rate control valve for controlling a flow rate of the liquid reducing agent or the precursor thereof supplied from the reducing agent tank to the injection nozzle;

a control unit for controlling the flow rate control valve so that the liquid reducing agent or the precursor thereof, at a flow rate in accordance with an engine operation state, is supplied to the injection nozzle;

an oscillator or fin disposed in a reducing agent supply system running from the reducing agent tank to the injection nozzle, wherein the oscillator is oscillated or the fin is rapidly rotated to thereby mix nano-sized to micro-sized bubbles into the liquid reducing agent or the precursor thereof injection- supplied from the injection nozzle; and a particle counter configured to measure the number and a diameter of particles of the bubbles mixed into the liquid reducing agent or the precursor thereof per unit volume, wherein the control unit further calculates a mixing ratio of the bubbles from the number and the diameter of the particles of the bubbles measured by the particle counter, and corrects the flow rate of the liquid reducing agent or the precursor thereof in accordance with the engine operation state based on the calculated mixing ratio of the bubbles.

* * * * *